(Model.)  4 Sheets—Sheet 1.
W. A. CRAWFORD.
TELEPHONE TRANSMITTER.
No. 270,752.  Patented Jan. 16, 1883.
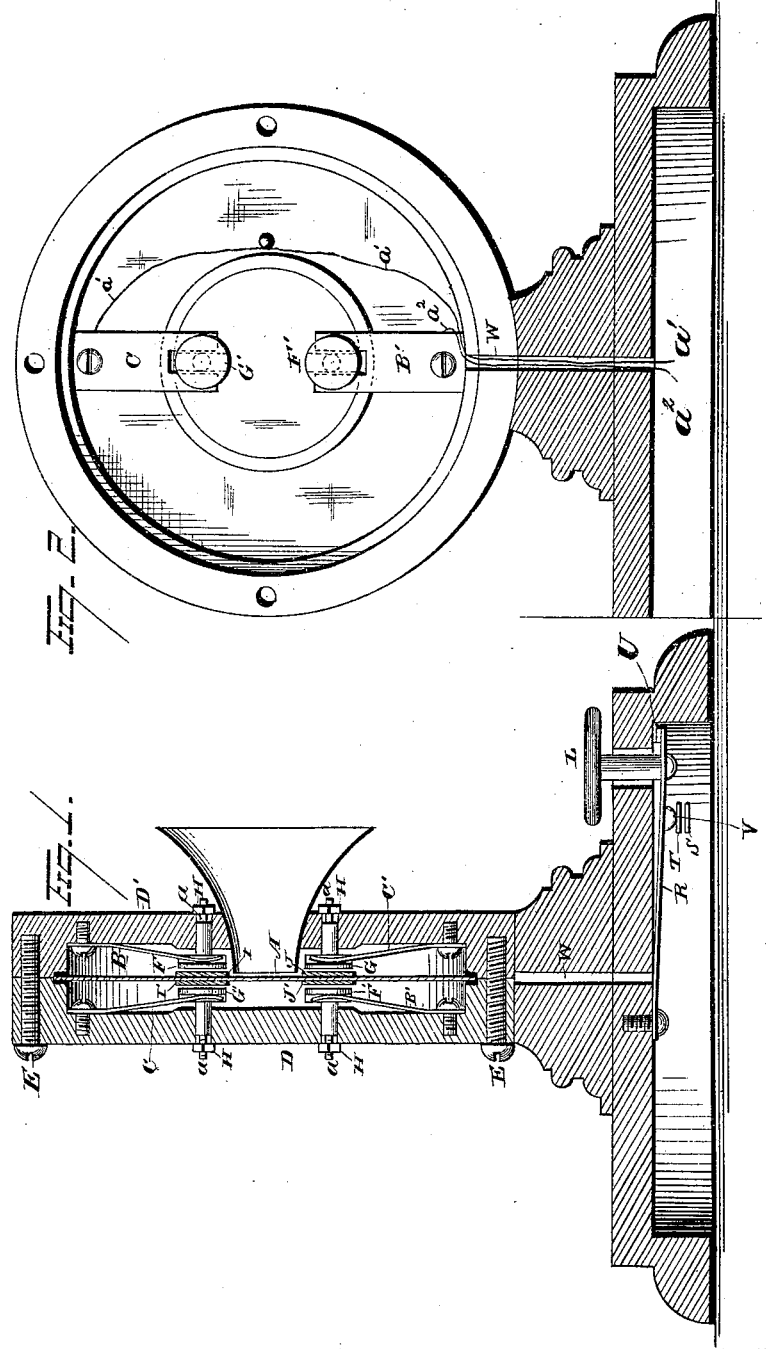
WITNESSES  INVENTOR (Model.) 4 Sheets—Sheet 2.
W. A. CRAWFORD.
TELEPHONE TRANSMITTER.
No. 270,752. Patented Jan. 16, 1883.
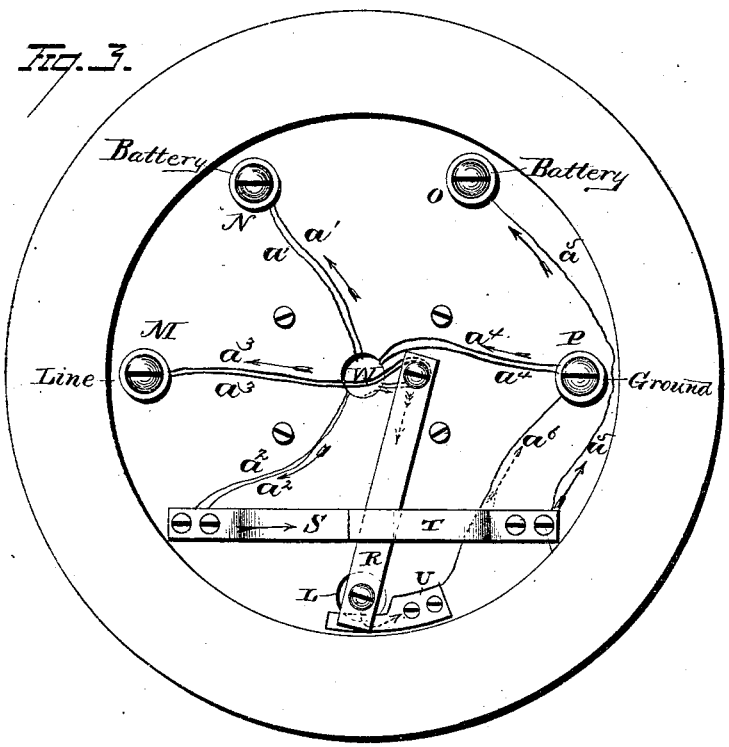
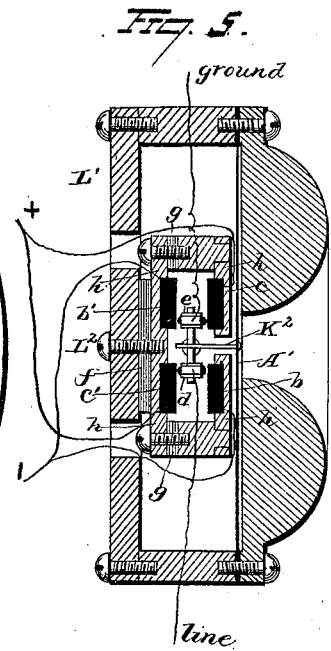
WITNESSES
INVENTOR
W. A. Crawford.
By H. A. Seymour.
ATTORNEY (Model.) 4 Sheets—Sheet 3.
W. A. CRAWFORD.
TELEPHONE TRANSMITTER.
No. 270,752. Patented Jan. 16, 1883.
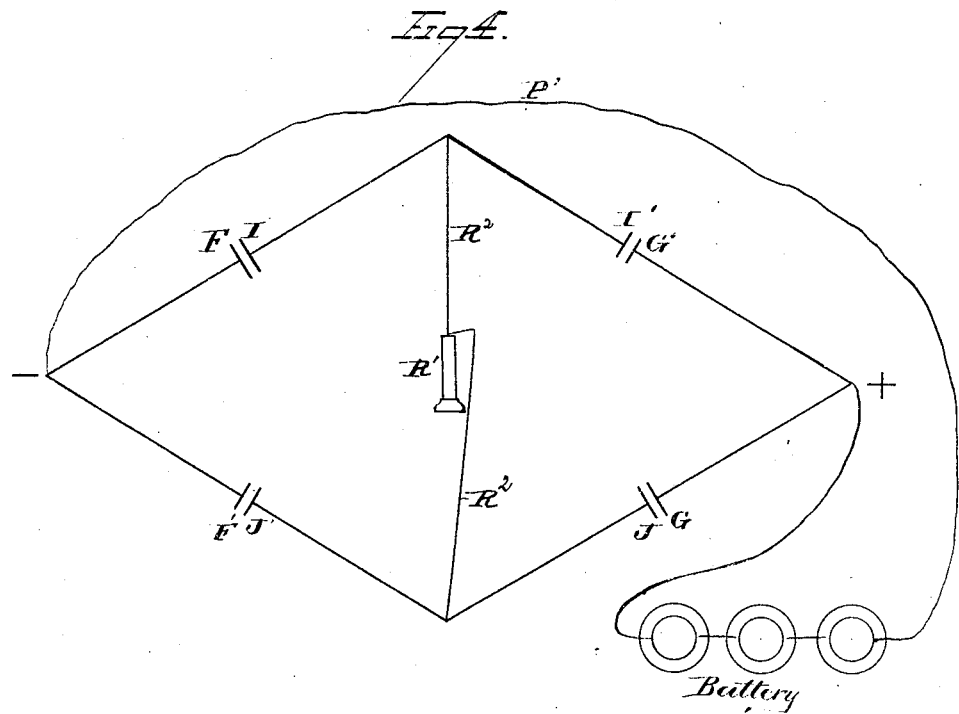
WITNESSES
E. L. Nottingham
Herman Moran
INVENTOR
W. A. Crawford.
By H. A. Seymour.
ATTORNEY (Model.)
4 Sheets—Sheet 4.
W. A. CRAWFORD.
TELEPHONE TRANSMITTER.
No. 270,752. Patented Jan. 16, 1883.
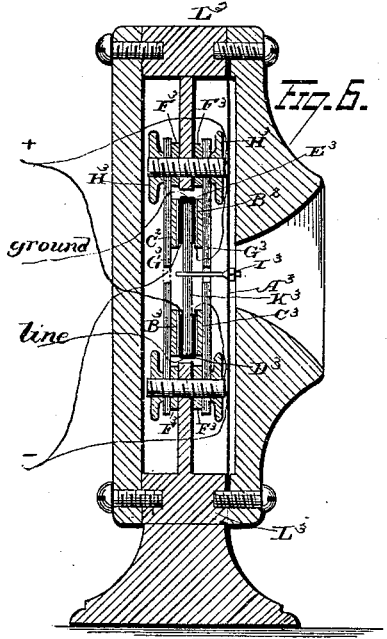
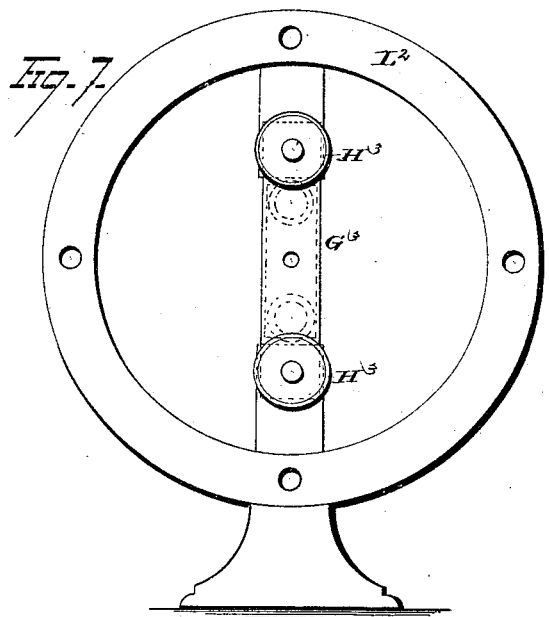
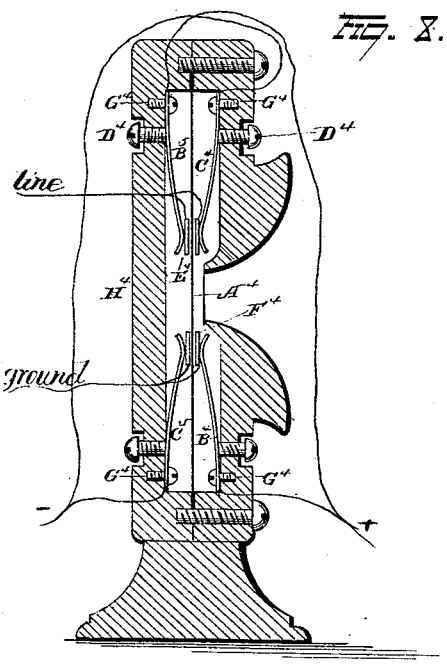
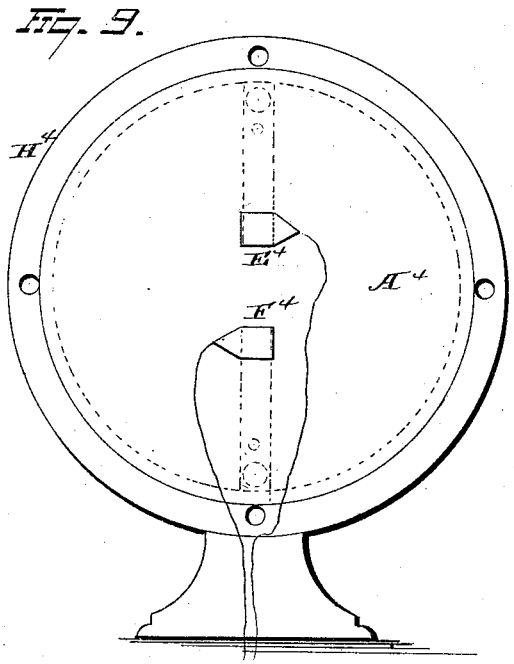
WITNESSES
INVENTOR
W. A. Crawford
By H. A. Symons
ATTORNEY

UNITED STATES PATENT OFFICE.

WITSIUS A. CRAWFORD, OF SAN ANTONIO, TEXAS, ASSIGNOR OF ONE-HALF TO EDWIN ELLIS, OF TERRE HAUTE, INDIANA.

TELEPHONE-TRANSMITTER.

SPECIFICATION forming part of Letters Patent No. 270,752, dated January 16, 1883.

Application filed September 8, 1880. (Model.)

*To all whom it may concern:*

Be it known that I, WITSIUS A. CRAWFORD, of San Antonio, in the county of Bexar and State of Texas, have invented certain new and useful Improvements in Telephone-Transmitters; and I do hereby declare the following to be a full, clear, and exact description of the invention, such as will enable others skilled in the art to which it pertains to make and use it, reference being had to the accompanying drawings, which form part of this specification.

The object of my transmitter is to cause a conversion of the sound-waves into electrical currents, which latter shall bear a closer analogy to said waves than has heretofore been accomplished by instruments employing battery-power. I attain this desired end by certain improved mechanism, adapting the principle of the electrical balance or Wheatstone's bridge to telephony. I employ this principle in the construction of my transmitter in such a manner that while the diaphragm is at rest the battery-currents are balanced against each other within the transmitter. Hence there is not an operative current through the line-wire and receiver, and this result occurs without regard to the size of the battery used; but the vibrating movement of the diaphragm in one direction caused by the sound-wave will determine an operative current of one polarity through the line-wire and receiver, and the vibrating movement of the diaphragm in the opposite direction caused by the sound-wave will determine an operative current of opposite polarity through the line and receiver. These operative currents will produce in the diaphragm or vibrator of the receiving-instrument a motion exactly similar to that which is produced in the diaphragm of the transmitter by the sound. The amplitude of vibration of the receiver's diaphragm will be increased in direct proportion to the strength of battery used. The curve which represents the sound-wave in its successive phases passing to and fro across a nodal line will accurately represent the electrical condition produced by my transmitter under the influence of said sound-wave upon the line and receiver, for the operative current, rising from zero to a positive, and then falling through zero to a negative maximum, passes in its alternations the electrical zero-line each time that the sound-wave crosses its nodal line. The perfection with which this transmitter converts the one force into another is due partially to the arrangement of parts by which the diaphragm is as free to move in one vibrating direction as in the other. The diaphragm is not cramped in its vibrating movement in one direction; but the principal reason for the efficiency of my transmitter is to be found in the novel mechanism for the application of the principle of the electrical balance or Wheatstone's bridge. The application of this principle involves the following results: First, in the absence of sound at the transmitter there is no operative current through the receiver; second, nearly the whole strength of the battery is at the service of each half of a sound-wave, and so much of this battery-power will be thrown into the line as the amplitude of each vibration or part of vibration shall determine; third, the peculiar construction of the transmitter admits of the lightest adjustment without the possibility of at any time opening the circuit by too great amplitude of vibration, thus securing a sensitiveness which is very desirable in galvanic transmitters; fourth, a volume of sound is produced which renders unnecessary the employment of any signaling apparatus other than the receiver, thereby eliminating a great source of derangement and obviating the necessity of handling either instrument; fifth, the transmitter is adapted to remain constantly adjusted, changes in temperature, strength, or size of battery having no effect upon it, for the same conditions which affect one side of the balanced circuit affect the other side in like manner, causing the transmitter to remain balanced.

The principle of my invention admits of embodiment in different forms of construction, and in the accompanying drawings I have represented in the first three figures the best apparatus now known to me, and in the remaining figures I have represented a few modifications of apparatus.

Figure 1 is a view in vertical central section of my preferred form of transmitter. Fig. 2 is an elevation of the interior of the back half of the transmitter-frame, the diaphragm being removed. Fig. 3 is a view of the bottom of the transmitter, showing the position of the binding-screws, the arrangement of the wires, and the switch. Fig. 4 is a diagram representing the connections made according to the principle of the electrical balance and free from the mechanism of the transmitter. Fig. 5 is a vertical central section of one modification. Fig. 6 is a similar view of another modification. Fig. 7 is an elevation of the interior of this last modification. Fig. 8 is a vertical central section of still another modification. Fig. 9 shows an elevation of the diaphragm of the modification shown in the preceding figure.

The diaphragm A is clamped between the frames D and D' by screws E, there being the usual rings of damping material between the diaphragm and frames. These frames should be made of hard rubber, or, if made of metal, the springs B B' C C' should be insulated therefrom. The four contact-pieces F F' and G G' are of metal, faced with platinum or not, and are pressed toward the diaphragm by the springs B B' and C C', said contact-pieces being provided with screw-threaded stems $a$ and nuts H, working on the latter.

Secured to the diaphragm, but insulated therefrom, are four disks of platinum, two disks on each face of the diaphragm, directly opposite and facing the four contact-pieces F F' and G G'. These disks are located in pairs on the two faces of the diaphragm, on opposite sides of the transmitter's mouth-opening. The surfaces of these contact-pieces F F' and G G' and of the two pairs of disks or buttons I I' and J J' are coated with carbon deposited directly from the flame of a kerosene-lamp. The thickness of this film may be determined from experiment. The said springs C C', and consequently their contact-pieces G G', are connected with the positive pole of the battery through fine wires $a'$ $a'$, having their outer ends secured to the binding-post N, through which the positive current enters the transmitter. The inner ends of the wires $a'$ $a'$ alluded to pass through the aperture W in the transmitter-base, a reverse view of which is shown in Fig. 3 of the drawings, and terminate respectively in the springs C C'.

The springs B B' and their contact-pieces F F' are connected with the negative pole of the batter through fine wires $a^2$ $a^2$, having their outer ends secured to the spring-bar S of the two spring circuit closing and breaking bars S and T, which are interposed in the line of the negative current of the battery-circuit, the bar T of the said spring-bars being connected by a wire, $a^5$, to the binding-post O, through which the negative battery-current enters the transmitter. The inner ends of the wires $a^2$ $a^2$ pass through the aperture W, (shown in Fig. 3 of the drawings,) and terminate respectively in the springs B B'. The object of thus interposing in the line of the negative current the spring-bars S and T and the ends attained by their employment will be described farther on.

The two pairs of disks I I' and J J' are respectively connected to the line-wires $a^3$ $a^3$ and ground-wires $a^4$ $a^4$ of the main circuit. In Fig. 3 of the drawings the line-wires $a^3$ $a^3$ enter the transmitter through the aperture W and terminate in the disks I I', secured to but insulated from the diaphragm. The outer ends of said wires $a^3$ $a^3$ are secured to the binding-post M, connecting with the transmitting-line proper. (Not here shown.) On the passage of the wires $a^3$ $a^3$ from the binding-post $m$ to the aperture W they are connected with the inner end of a spring-bar, R, and of this hereafter. The same figure of the drawings also shows the ground-wires $a^4$ $a^4$, which, like the line-wires $a^3$ $a^3$, enter the transmitter through aperture W and terminate in the disks J J', secured to but insulated from the diaphragm. The outer ends of the wires $a^4$ $a^4$ are secured to the binding-post P, connecting with the ground-line proper, which the drawings do not show. It will thus be seen that in the absence of outside disturbing influences, and when the diaphragm is in repose, the disturbing influence of the positive current exerted through the contact-pieces G G', located on opposite faces of said diaphragm and at points diametrically opposite each other, will be exactly overcome by the disturbing influence of a negative current of equal intensity with the positive current, and exerted on the diaphragm through the contact-pieces F F', located also on opposite points of the diaphgram and in positions diametrically opposite each other. In other words, a positive and a negative current of exactly-equal intensity are so disposed within the transmitter that their combined effect upon the diaphragm will be *nil*. In this condition of affairs, with balanced forces, while two currents constantly pass through the transmitter and line-wire, there are no operative currents, and the receiver will be unaffected. To obtain a perfect balance of the negative and positive currents, the contact-pieces G G' and F F', through which said currents are respectively exerted require, an exceedingly nice and correct adjustment, which is obtained by means of the four nuts H, which are mounted on the stems $a$ of the contact pieces or springs. These nuts may be manipulated to throw the contact-pieces in closer proximity with the platinum disks on the diaphragm or to increase the interposing space between them, as circumstances may necessitate.

The forward end of the spring-bar R, before alluded to, is in its normal position in contact with a block, U, which latter is connected through a shunt, $a^6$, to the binding-post P. The depression of a finger-button, L, will, however, break this contact and close, through the agency of an insulated button, V, located on the under face of bar R, the contiguous ends of the bars S and T, interposed in the negative line of the battery-circuit. The ends of these two bars S and T are normally apart, and therefore it is only when the button is depressed and the circuit is closed that the battery-circuit is completed through the transmitter, and only then that it exerts any influence thereon. When these bars S and T are apart the spring-bar will be in its normal position and in contact with the block U, and the line-current will be short-circuited through M R U P. Therefore until the finger-button is depressed there can be no currents through the transmitter, which arrangement insures it against the danger of the passage of currents of too great intensity through its nicely-adjusted mechanism and deranging and burning it; but the moment the finger-button is depressed the battery-circuit will be closed and thrown into the transmitter, where the currents will be balanced, as described, and the interruption of the line-circuit through M R U P will cause it to take a prescribed path through the transmitter. Supposing the button L to be depressed, the battery-current to be balanced, and the line-current to be flowing through the transmitter, the diaphragm will be exquisitely sensitive to any outside disturbing influences. If, now, the balance be disturbed by vibrations induced by the voice, the diaphragm will be started vibrating and the conductivity of the positive and negative carbon films on one side of the diaphragm will be increased, while the conductivity of the positive and negative films on the opposite side of the diaphragm will be decreased. This change in the conductivity of the films will destroy the balance of the battery-current, and the vibrating movement of the diaphragm in one direction caused by the sound-wave will determine an operative current of one polarity through the line-wire and receiver, and the vibrating movement of the diaphragm in the opposite direction caused by the sound-wave will determine an operative current of opposite polarity through the line and receiver.

In order to show the connections of the electrical balance free from the mechanism of the transmitter, I have recourse to the diagram represented in Fig. 4 of the drawings. In this drawing the four contact-pieces G G' F F' and the four platinum disks I I' J J' are shown in the relative positions to each other which they have in the transmitter. When, now, the diaphragm vibrates in one direction, the pressure between the contact-point G' and disk I' and the contact-point F' and disk J' will be increased, and to the same extent the pressure between the contact-point G and disk J and the contact-point F and I will be decreased. The vibration of the diaphragm in an opposite direction will of course produce a reverse effect. Suppose the diagram to represent an arrangement corresponding with that of Wheatstone's bridge, and that the line R² represents the bridge and R' the telephone-receiver located therein. If, now, the diaphragm is given an impulse to increase the pressure between the contact-point G' and F' and disk I' and J', respectively, the neutralization of the two currents will be overcome and two operative currents will be started, flowing through the transmitter and line. The stronger of these currents will take a course indicated by + G' I' R² J' F' and flow back to the battery through line P', and the weaker current will take a course indicated by + G J R² I F and be returned to the battery through line P'. It will thus be apparent that, as before stated, two currents will constantly and uninterruptedly, but with alternate variations of quantity, pass over the line, and the effect on the receiver will be equal to the effect of a single current having the direction of the stronger and a volume equal to the difference of the currents.

In the modification shown in Fig. 5 the diaphragm A' is secured by the pin K² to a piece of hard rubber which supports the two contact-pieces d and e, which are connected to the wires marked "line" and "ground." The battery-wires marked + and − divide, and are connected to pieces of hard carbon b b' and c c', which are secured in hard-rubber pieces h, the latter having pieces of soft rubber g to admit of adjustment. The several parts are secured to the frame L' by a screw, L², a soft-rubber packing, f, being interposed between the frame and said parts. The action of this instrument is microphonic.

In the modification represented in Figs. 6 and 7 the diaphragm A³ is secured by pin I³ to the hard-rubber piece K³, the latter having mounted on each end contact-pieces D³ and E³, formed of metal. These contact-pieces extend to both sides of the piece K³, and are soldered to the wires marked "line" and "ground." The two hard-rubber pieces G³ have secured to their inner faces four metal disks, B² B³ C² C³, which are soldered respectively to branch wires terminating in + and −. The pieces G³ are adjusted by the thumb-nuts H³ against soft-rubber washers F³ in contact with the brass frame L³. The surfaces of the contact-pieces D³ and E³ and the metal disks B² B³ and C² C³ are coated with lamp-black directly from the lamp.

In the modification represented in Figs. 8 and 9, on the surface of the diaphragm A⁴, at E⁴ and F⁴, are secured four disks of platinum-foil, insulated from the diaphragm, but soldered, as shown, to branch wires terminating in "line" and "ground." The springs B⁴ B⁵ and C⁴ C⁵ are secured to the wood or hard-rubber frame H⁴ by the screws G⁴, at which points branch wires connect with + and −. These springs are adjusted by the screws D⁴ to press lightly against the contact-pieces at E⁴ and F⁴, the parts in contact being coated with a thin film of lamp-black directly from the lamp.

From the foregoing description it will be seen that the different forms of mechanism shown in the drawings are severally based upon a principle of construction which may be expressed as follows: Two contact-pairs, respectively, connected to the line and ground wires, are mechanically connected with the vibratory diaphragm. Two other contact-pairs are respectively connected to opposite poles of an electromotor, the two branches of the contact-pairs which are connected to the line-wire being adapted at a vibration of the diaphragm to be pressed with relatively-different degrees of force against the corresponding branches of the appropriate one of the two contact-pairs which are connected to the electromotor.

Having fully described my invention, what I claim as new, and desire to secure by Letters Patent, is—

1. In a telephone-transmitter, the combination, with two contact-pairs, respectively connected to the line and ground wires, and a vibratory diaphragm to which said contact-pairs are mechanically connected, of two independent contact-pairs, respectively connected to opposite electric poles, the two branches of each contact-pair connected to the electromotor being adapted respectively to have contact with the contact-pairs connected to the line and ground wires, substantially as set forth.

2. In a telephone-transmitter, the combination, with two contact-pairs, respectively connected to the line and ground wires, and a vibratory diaphragm to which said contact-pairs are mechanically connected, of two independent contact-pairs, respectively connected to opposite electric poles, and having their branches severally located opposite the appropriate branches of said contact-pair connected to the line and ground wires, substantially as set forth.

3. In a telephone-transmitter, the combination, with a vibratory diaphragm, two contact-pairs respectively connected to the line and ground wires, and devices mechanically connecting said contact-pairs with the diaphragm, of two independent contact-pairs, respectively connected to opposite electric poles, the two branches of the contact-pair connected to the line-wire being adapted at a vibration of the diaphragm to be pressed with relatively-different degrees of force against the corresponding branches of the appropriate contact-pair connected to the electromotor, substantially as set forth.

4. In a telephone-transmitter, the combination, with two contact-pairs, respectively connected to the line and ground wires, and a vibratory diaphragm to which said contact-pairs are mechanically connected, of two independent contact-pairs, respectively connected to opposite electric poles, the two branches of each of the latter contact-pairs being adapted respectively to have contact with the contact-pairs connected to the line and ground wires, and adjusting devices which severally maintain the branches of the contact-pairs connected to the electromotor at different distances relative to the branches of the contact-pairs connected to the line and ground wires, substantially as set forth.

5. In a telephone-transmitter, the combination, with two contact-pairs, respectively connected to the line and ground wires, and a vibratory diaphragm to which said contact-pairs are mechanically connected, of two independent contact-pairs, respectively connected to opposite electric poles, the two branches of each of the latter contact-pairs being adapted respectively to have contact with the contact-pairs connected to the line and ground wires, the branches of the contact-pairs connected to the electromotor being severally provided with screw-threaded stems and nuts working on the latter, substantially as set forth.

6. In a telephone-transmitter, the combination, with a diaphragm provided with four independent contact-pieces, connected in pairs respectively to the line and ground wires, of an electromotor provided with four wires (two from each pole) running respectively to four contact-pieces, which latter severally press against the corresponding contact-pieces of the diaphragm, substantially as set forth.

7. In a telephone-transmitter, the combination, with a vibrating diaphragm provided with four contact-pieces located in pairs on the two faces of the diaphragm and opposite sides of the mouth-opening, said pairs being connected respectively to the line and ground wires, of an electromotor having four wires (two from each pole) running to contact-pieces which severally press against the contact-pieces of the diaphragm, the two positive wires being severally connected to contact-pieces located opposite on the two faces of the diaphragm and on opposite sides of the mouth-opening, the two negative wires being likewise severally connected to contact-pieces located respectively opposite the two faces of the diaphragm and on opposite sides of the mouth-opening, substantially as set forth.

8. In a telephone-transmitter, the combination, with two contact-pairs, respectively connected to the line and ground wires, a vibratory diaphragm to which said contact-pairs are mechanically connected, and two independent contact-pairs, respectively connected to opposite electric poles, of a short circuit to the ground-wire from the contact-pair which connects with the line, and a device adapted to maintain said short circuit open or closed, as desired, substantially as set forth.

9. In a telephone-transmitter, the combination, with two contact-pairs, respectively connected to the line and ground wires, a vibratory diaphragm to which said contact-pairs are mechanically connected, and two independent contact-pairs, respectively connected to opposite electric poles, of a short circuit to the ground-wire from the contact-pair which connects with the line, and a device adapted to maintain said short circuit closed simultaneously with maintaining open the circuit from one electric pole to its appropriate contact-pair, substantially as set forth.

10. In a telephone-transmitter, the combination, with two contact-pairs, respectively connected to the line and ground wires, a vibratory diaphragm to which contact-pairs are mechanically connected, and two independent contact-pairs, respectively connected to opposite electric poles, of a short circuit to the ground-wire from the contact-pair which connects with the line, and a device adapted to maintain said short circuit open simultaneously with maintaining closed the circuit from one electric pole to its appropriate contact-pair, substantially as set forth.

In testimony that I claim the foregoing I have hereunto set my hand this 26th day of August, 1880.

WITSIUS A. CRAWFORD.

Witnesses:
C. K. BRENEMAN,
H. P. BEE.